US010480963B2

United States Patent
Hsiao et al.

(10) Patent No.: US 10,480,963 B2
(45) Date of Patent: Nov. 19, 2019

(54) ABSOLUTE POSITION READOUT APPARATUS

(71) Applicant: HIWIN MIKROSYSTEM CORP., Taichung (TW)

(72) Inventors: Heng-Sheng Hsiao, Taichung (TW); Chi-Yuan Cheng, Taichung (TW); Cheng-Kuo Sung, Taichung (TW); Tsung-Shune Chin, Taichung (TW); Sheng-Ching Wang, Taichung (TW); Jen-Yuan Chang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 218 days.

(21) Appl. No.: 15/622,278

(22) Filed: Jun. 14, 2017

(65) Prior Publication Data

US 2018/0364068 A1 Dec. 20, 2018

(51) Int. Cl.
*G01D 5/245* (2006.01)
*G01D 5/16* (2006.01)

(52) U.S. Cl.
CPC .................. *G01D 5/2458* (2013.01)

(58) Field of Classification Search
CPC .................. G01D 5/145; G01D 5/16
See application file for complete search history.

(56) References Cited

U.S. PATENT DOCUMENTS

| | | | | |
|---|---|---|---|---|
| 4,785,241 A * | 11/1988 | Abiko | ................ | G01D 5/145 324/207.21 |
| 9,803,998 B1 * | 10/2017 | Schrubbe | ............ | G01D 5/2455 |
| 2011/0267043 A1 * | 11/2011 | Dolsak | ................ | G01D 5/2455 324/207.11 |
| 2013/0200886 A1 * | 8/2013 | Kirste | ................ | G01D 5/2455 324/207.22 |

* cited by examiner

Primary Examiner — Akm Zakaria
(74) Attorney, Agent, or Firm — Rosenberg, Klein & Lee (57) ABSTRACT

An absolute position readout apparatus includes an encoder device and a readout device. The readout device includes multiple first and second magnetic sensing components that correspond to an absolute track of the encoder device, and a third magnetic sensing component and a fourth magnetic sensing components that correspond to an incremental track of the encoder device. The third magnetic sensing component is configured to be spaced apart from the fourth magnetic sensing component by a specific distance, so as to prevent misreading of absolute position information from the first or second magnetic sensing components being at positions corresponding to boundaries between adjacent magnetized regions of the absolute track.

10 Claims, 12 Drawing Sheets

ABSOLUTE POSITION READOUT APPARATUS

FIELD

The disclosure relates to a position readout apparatus, and more particularly to an absolute position readout apparatus.

BACKGROUND

Figure 1:
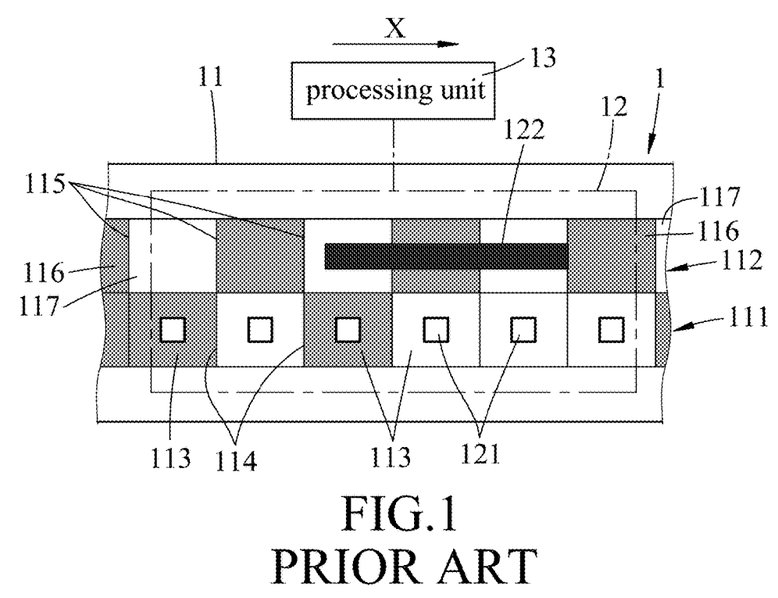
FIG. 1 is schematic diagram illustrating a conventional absolute position readout device.

Referring to FIG. 1, a conventional absolute readout apparatus includes an encoder device 11, a readout device 12 and a processing unit 13. The encoder device 11 is spaced apart from the readout device 12, and is movable relative to the readout device 12 in a moving direction (X). The encoder device 11 includes an absolute magnetic track 111 and an incremental magnetic track 112 which are disposed side-by-side and each of which extends in the moving direction (X). The absolute magnetic track 111 has a plurality of absolute-track magnetized regions 113 that form multiple absolute-track boundaries 114 thereamong. The absolute-track boundaries 114 are formed equidistantly along the moving direction (X). The incremental magnetic track 112 has a plurality of first incremental-track magnetized regions 116 with first magnetic polarity and a plurality of second incremental-track magnetized regions 117 with second magnetic polarity that differs from the first magnetic polarity. The first incremental-track magnetized regions 116 and the second incremental-track magnetized regions 117 are arranged alternately and form multiple incremental-track boundaries 115 thereamong. The incremental-track boundaries 115 are formed equidistantly along the moving direction (X). The readout device 12 includes a plurality of digital Hall sensors 121 that correspond to the absolute magnetic track 111 and that are arranged equidistantly along the moving direction (X), and a magnetoresistive sensor 122 that corresponds to the incremental magnetic track 112. The processing unit 13 is electrically coupled to the digital Hall sensors 121 and the magnetoresistive sensor 122.

The digital Hall sensors 121 are configured to sense magnetic fields of the absolute-track magnetized regions 113 that correspond in position thereto for the processing unit 13 to perform decoding thereon to obtain current absolute position information of an object (e.g., metrology systems, motion systems, CNC Mills, semiconductor steppers, etc.) mounted with the encoder device 11. The magnetoresistive sensor 112 is configured to sense movement amount of the first incremental-track magnetized regions 116 and the second incremental-track magnetized regions 117 by magnetic sensing for the processing unit 13 to obtain displacement information of the encoder device 11.

Figure 2:
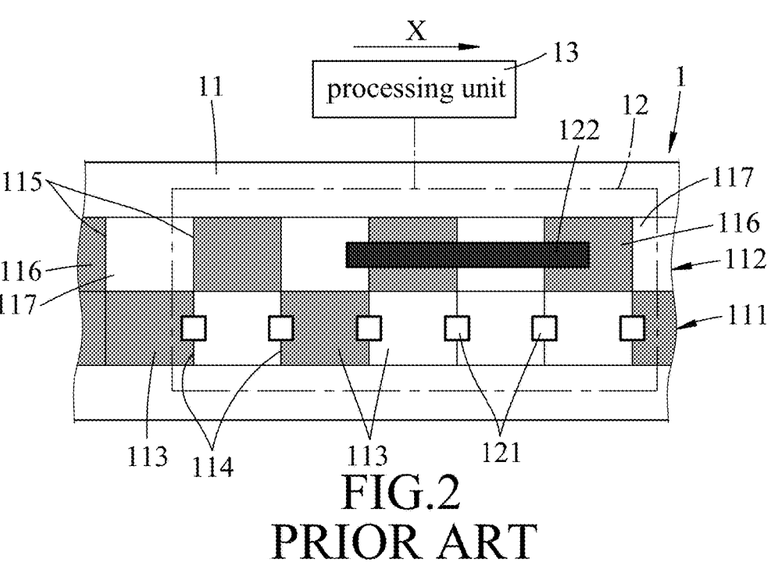
FIG. 2 is a schematic diagram illustrating that digital Hall sensors of the conventional absolute position readout device are disposed at position corresponding to absolute-track boundaries formed by absolute-track magnetized regions.

As depicted in FIG. 2, when the abovementioned digital Hall sensors 121 are exactly aligned with the absolute-track boundaries 114, at one or more of which the magnetic field reverses, the magnetic fields of the absolute-track magnetized regions 113 (i.e., the magnetic flux densities) may be too small so the magnetic fields actually sensed by the digital Hall sensors 121 may not come from the correct absolute-track magnetized regions 113 (for instance, assuming that the digital Hall sensors 121 supposedly should each sense the magnetic field of the absolute-track magnetized region 113 immediately to its left, but in reality the magnetic field sensed by one of the digital Hall sensors 121 may come from the absolute-track magnetized region 113 immediately to its right instead), resulting in misreading of the absolute position information.

SUMMARY

Therefore, an object of the disclosure is to provide an absolute position readout apparatus that can alleviate at least one of the drawbacks of the prior art.

According to one aspect of the disclosure, the absolute position readout device includes an encoder device and a readout device that are spaced apart from each other and that are configured such that the encoder device is movable relative to the readout device in a moving direction. The encoder device includes an absolute magnetic track and an incremental magnetic track which are disposed side-by-side and each of which extends in the moving direction. The absolute magnetic track has a plurality of absolute-track magnetized regions which form a plurality of absolute-track boundaries thereamong. The absolute-track boundaries are formed equidistantly along the moving direction with a distance between each adjacent two thereof being 2 P. The incremental magnetic track has a plurality of first incremental-track magnetized regions with first magnetic polarity and a plurality of second incremental-track magnetized regions with second magnetic polarity which differs from the first magnetic polarity. The first incremental-track magnetized regions and the second incremental-track magnetized regions are arranged alternately, and form a plurality of incremental-track boundaries thereamong. The incremental-track boundaries are formed equidistantly along the moving direction with a distance between each adjacent two thereof being P. For each of the absolute-track boundaries, a closest one of the incremental-track boundaries is spaced apart therefrom by a distance of $\rho$ in a displacement direction same as or opposite to the moving direction, where $0 \leq \rho \leq 2$ P. When $\rho=0$, the absolute-track boundary is aligned with the closest one of the incremental-track boundaries. The readout device includes a group of first magnetic sensing components, a group of second magnetic sensing components, a third magnetic sensing component and a fourth magnetic sensing component. The first magnetic sensing components correspond to the absolute magnetic track, and are arranged equidistantly along the moving direction with a distance between each adjacent two thereof being 2 P. The second magnetic sensing components correspond to the absolute magnetic track. The first magnetic sensing components and the second magnetic sensing components are arranged alternately along the moving direction and adjacent two thereof are spaced apart from each other by a distance of P. The third magnetic sensing component corresponds to the incremental magnetic track, and is spaced apart from a closest one of the first and second magnetic sensing components by a distance of $\rho$ in the displacement direction. The fourth magnetic sensing component corresponds to the incremental magnetic track, and is spaced apart from the third magnetic sensing component along the moving direction by a center-to-center distance of $(N-0.5) \times P$, where N is a positive integer. When $\rho=0$, the third magnetic sensing component is aligned with one of the first magnetic sensing components and the second magnetic sensing components.

According to another aspect of the disclosure, the absolute position readout apparatus includes an encoder device and a readout device that are spaced apart from each other and that are configured such that the encoder device is rotatable relative to the readout device in a rotary direction about an axis. The encoder device includes an absolute magnetic track and an incremental magnetic track which are disposed side-by-side and each of which extends in the rotary direction. The absolute magnetic track has a plurality of absolute-track magnetized regions which form a plurality of absolute-track boundaries thereamong. The absolute-track boundaries are formed equidistantly along the rotary direction with an angular distance between each adjacent two thereof being 2 A. The incremental magnetic track has a plurality of first incremental-track magnetized regions with first magnetic polarity and a plurality of second incremental-track magnetized regions with second magnetic polarity which differs from the first magnetic polarity. The first incremental-track magnetized regions and the second incremental-track magnetized regions are arranged alternately, and form a plurality of incremental-track boundaries thereamong. The incremental-track boundaries are formed equidistantly along the rotary direction with an angular distance between each adjacent two thereof being A. For each of the absolute-track boundaries, a closest one of the incremental-track boundaries is spaced apart therefrom by an angular distance of α in a displacement direction same as or opposite to the rotary direction, where 0≤α≤2 A. When α=0, the absolute-track boundary is aligned with the closest one of the incremental-track boundaries in a radial direction with respect to the axis. The readout device includes a group of first magnetic sensing components, a group of second magnetic sensing components, a third magnetic sensing component and a fourth magnetic sensing component. The first magnetic sensing components correspond to the absolute magnetic track, and are arranged equidistantly along the rotary direction with an angular distance between each adjacent two thereof being 2 A. The second magnetic sensing components correspond to the absolute magnetic track. The first magnetic sensing components and the second magnetic sensing components are arranged alternately along the rotary direction and each adjacent two thereof are spaced apart from each other by an angular distance of A. The third magnetic sensing component corresponds to the incremental magnetic track, and is spaced apart from a closest one of the first and second magnetic sensing components by an angular distance of α in the displacement direction. The fourth magnetic sensing component corresponds to the incremental magnetic track, and is spaced apart from the third magnetic sensing component along the rotary direction by an angular center-to-center distance of $(N-0.5) \times A$, where N is a positive integer. When α=0, the third magnetic sensing component is aligned with one of the first magnetic sensing components and the second magnetic sensing components in the radial direction.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
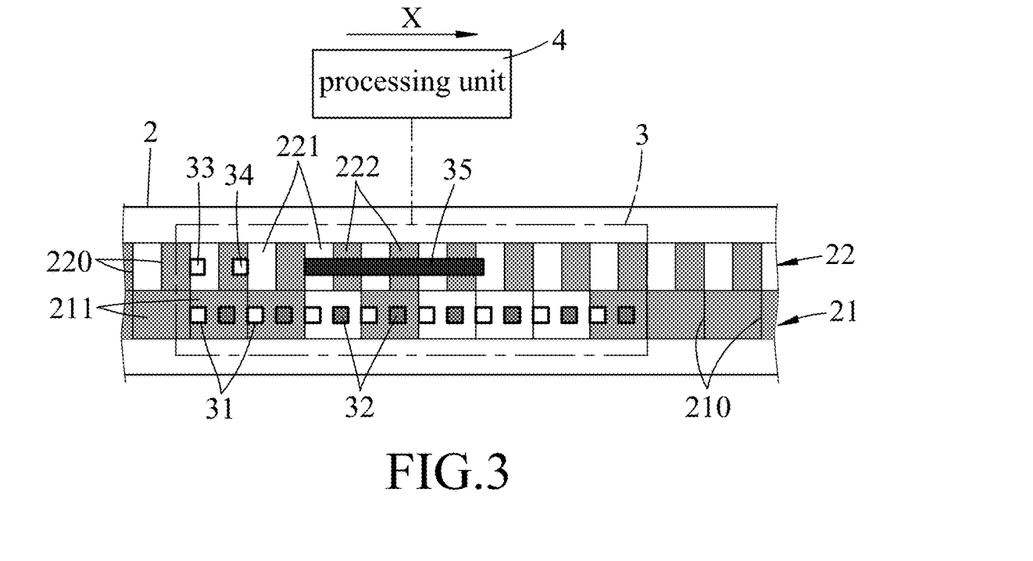
FIGS. 3-10 are schematic diagrams illustrating operations of a first exemplary implementation of a first embodiment of the absolute position readout device according to this disclosure.
Figure 4:
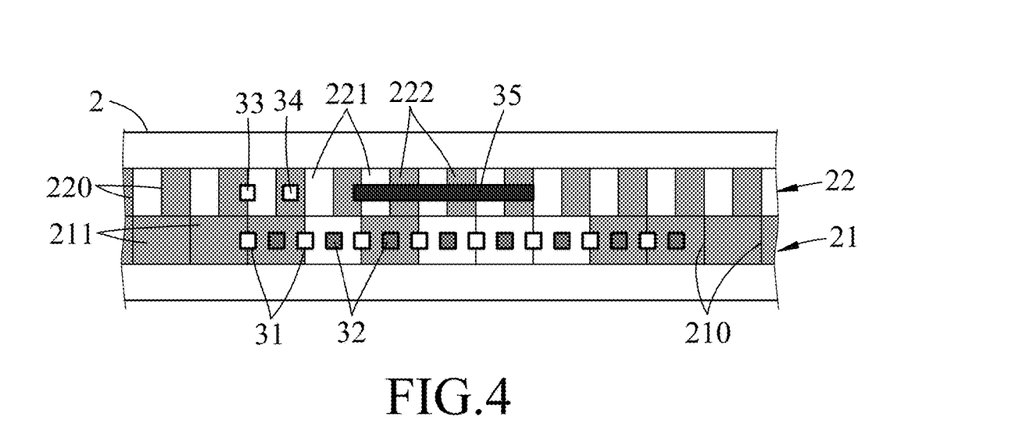
Figure 5:
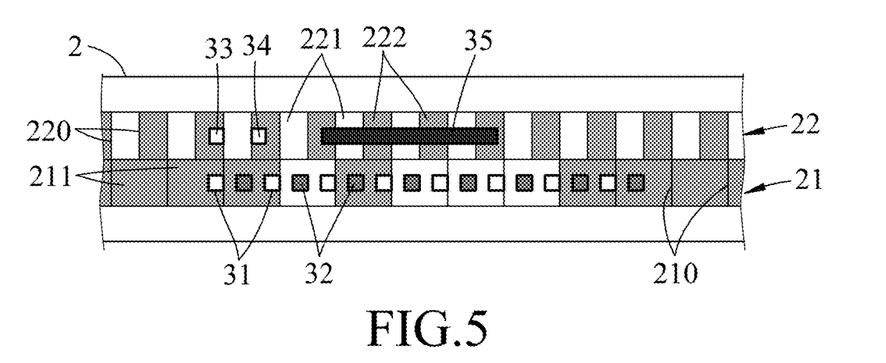
Figure 6:
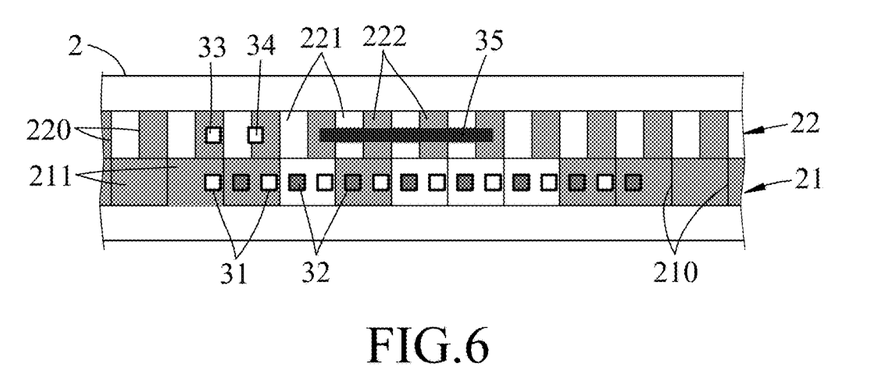
Figure 7:
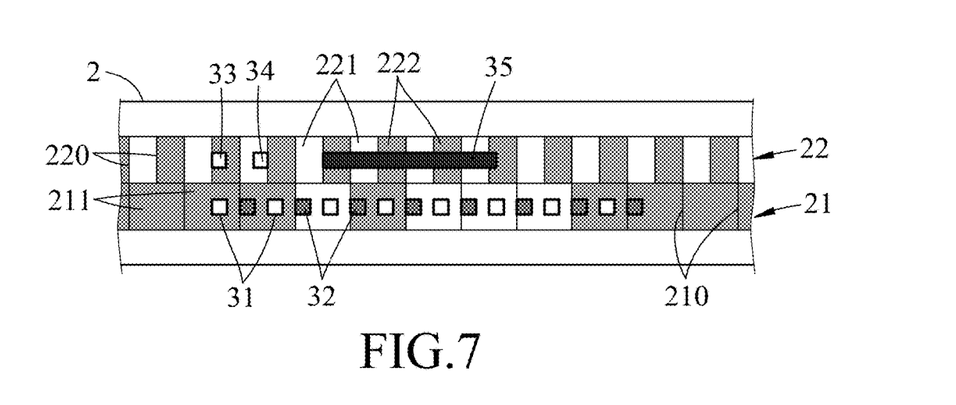
Figure 8:
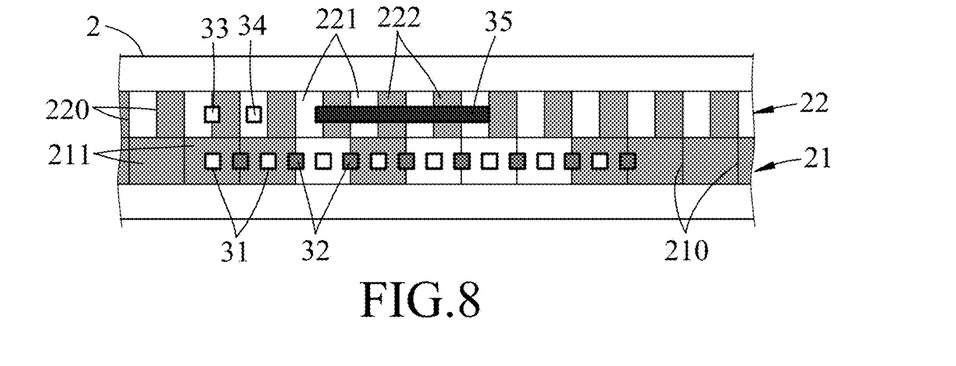
Figure 9:
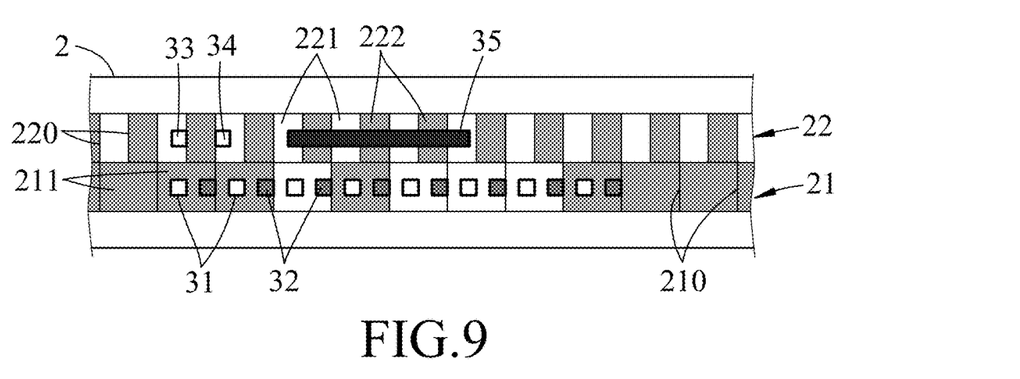
Figure 10:
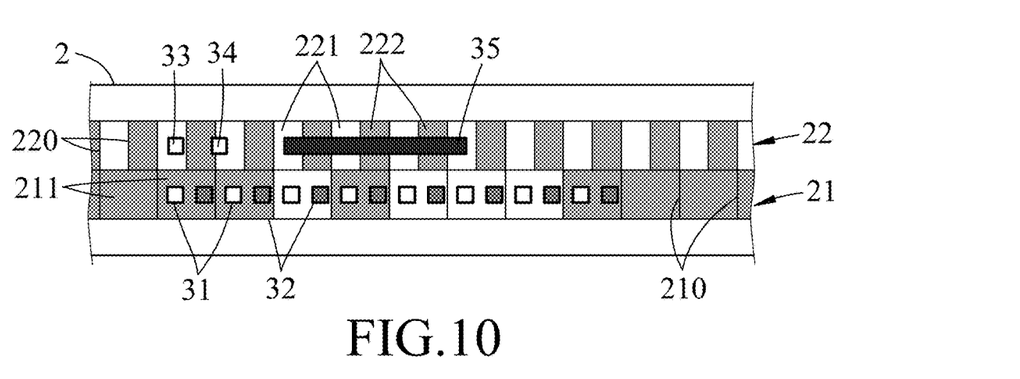
Figure 11:
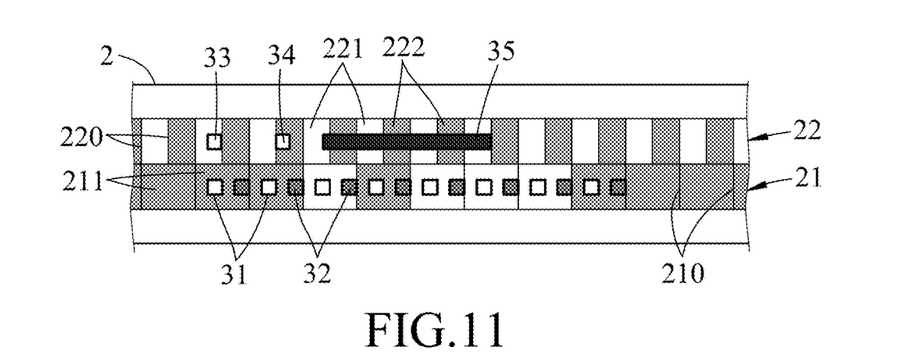
FIGS. 11-18 are schematic diagrams illustrating operations of a second exemplary implementation of the first embodiment.
Figure 12:
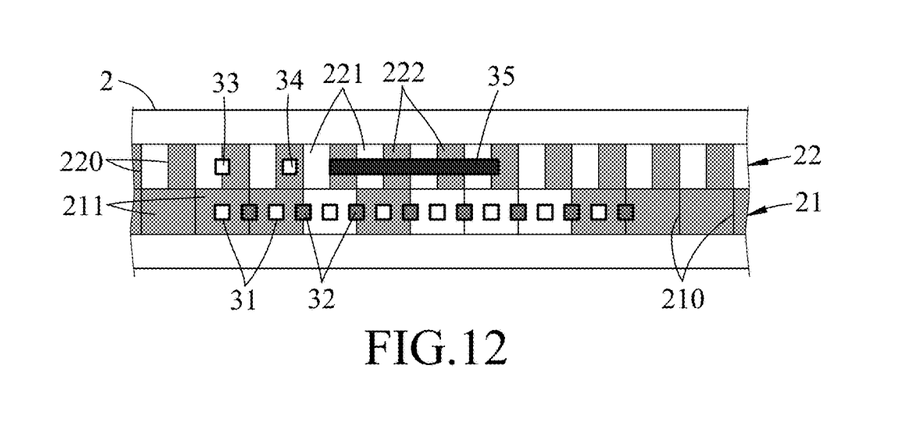
Figure 13:
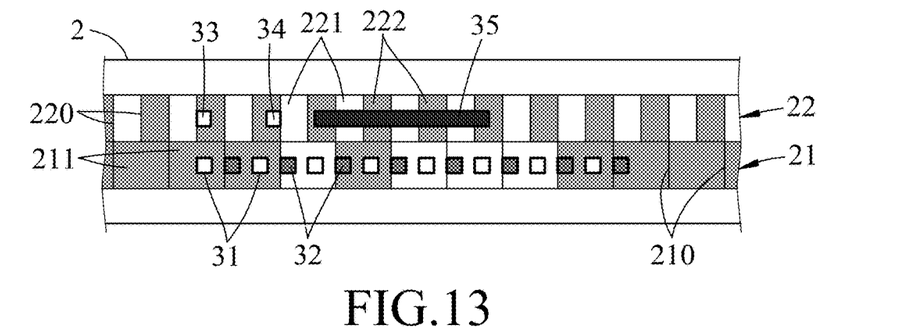
Figure 14:
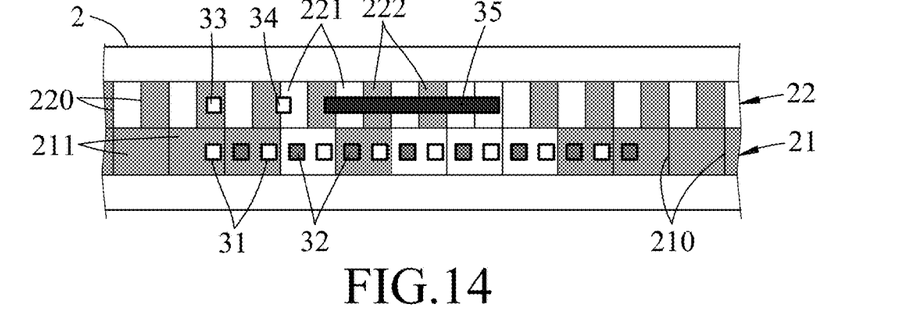
Figure 15:
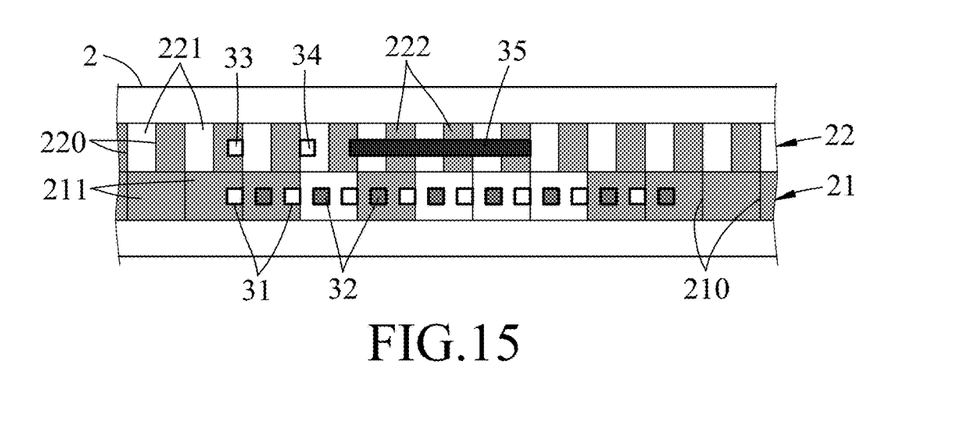
Figure 16:
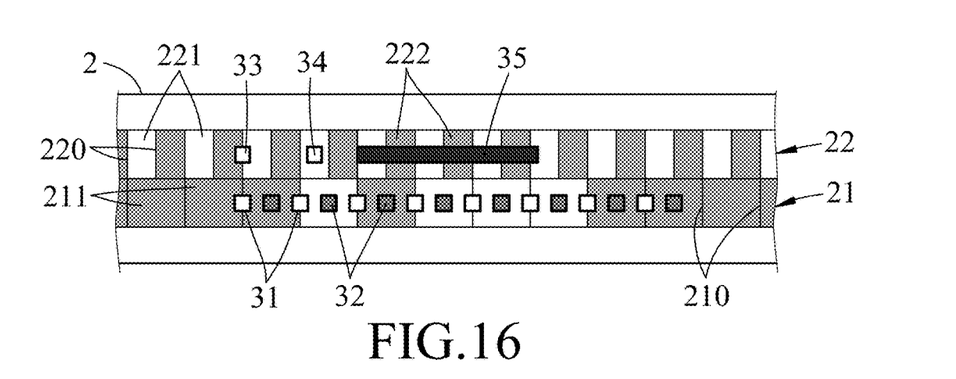
Figure 17:
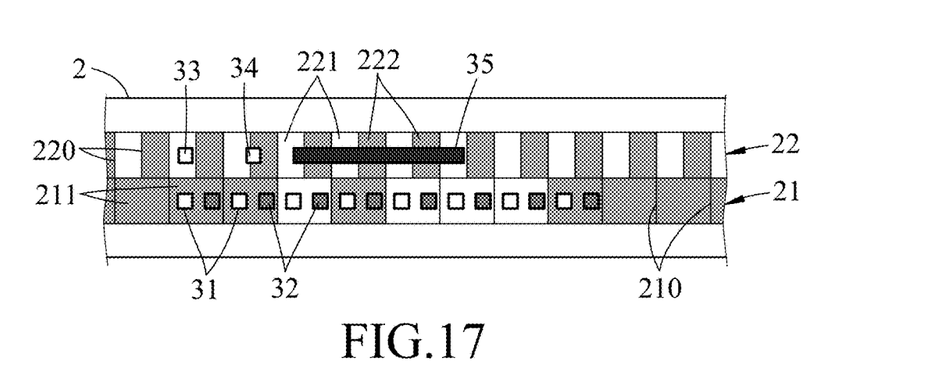
Figure 18:
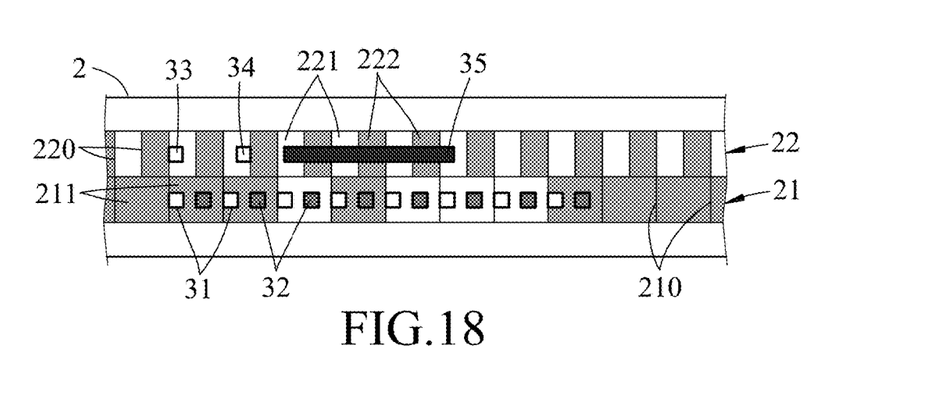

Referring to FIG. 3, the first embodiment of the absolute position readout device according to this disclosure is shown to include an encoder device 2, a readout device 3 and a processing unit 4. The encoder device 2 and the readout device 3 are spaced apart from each other and are configured such that the encoder device 2 is movable relative to the readout device 3 in a moving direction (X). In other words, in one embodiment, the readout device 3 may be fixed and the encoder device 2 is movable in the moving direction (X); and in one embodiment, the encoder device 2 may be fixed and the readout device 3 is movable in a direction opposite to the moving direction (X). However, this disclosure is not limited to such.

The encoder device 2 includes an absolute magnetic track 21 and an incremental magnetic track 22 which are disposed side-by-side and each of which extends in the moving direction (X). The absolute magnetic track 21 has a plurality of absolute-track magnetized regions 211 which form a plurality of absolute-track boundaries 210 thereamong. The absolute-track boundaries 210 are formed equidistantly along the moving direction (X) with a distance between each adjacent two being 2 P. The incremental magnetic track 22 has a plurality of first incremental-track magnetized regions 221 with first magnetic polarity and a plurality of second incremental-track magnetized regions 222 with second magnetic polarity which differs from the first magnetic polarity. The first incremental-track magnetized regions 221 and the second incremental-track magnetized regions 222 are arranged alternately, and form a plurality of incremental-track boundaries 220 thereamong. The incremental-track boundaries 220 are formed equidistantly along the moving direction (X) with a distance between each adjacent two being P. In this embodiment, each absolute-track boundary 210 is aligned with one of the incremental-track boundaries 220.

The readout device 3 includes a group of first magnetic sensing components 31, a group of second magnetic sensing components 32, a third magnetic sensing component 33, a fourth magnetic sensing component 34 and a fifth magnetic sensing component 35. The first magnetic sensing components 31 are arranged equidistantly along the moving direction (X) with a distance between each adjacent two being 2 P. The first and second magnetic sensing components 31, 32 correspond to the absolute magnetic track 21, and are arranged alternately and equidistantly along the moving direction (X) and each adjacent two are spaced apart from each other by a distance of P. The third and fourth magnetic sensing components 33, 34 correspond to the incremental magnetic track 22, and are spaced apart from each other along the moving direction (X). A center-to-center distance between the third and fourth magnetic sensing components 33, 34 is $(N-0.5) \times P$, where N is a positive integer. In a case that each absolute-track boundary 210 is aligned with one of the incremental-track boundaries 220, the third magnetic sensing component 33 may be arranged to be aligned with either one of the first magnetic sensing components 31 or one of the second magnetic sensing components 32. In the exemplary implementation as shown in FIG. 3, the third magnetic sensing component 33 is aligned with one of the first magnetic sensing components 31. In this embodiment, the first and second magnetic sensing components 31, 32 are digital Hall sensors, and the third and fourth magnetic sensing components 33, 34 are analog Hall sensors, but this disclosure is not limited to such.

The processing unit 4 is electrically coupled to the group of first magnetic sensing components 31, the group of second magnetic sensing components 32, and the third to fifth magnetic sensing components 33-35. The processing unit 4 is set with a predetermined magnetic field range that corresponds to each incremental-track boundary 220, for example, ±30 Gs. In other words, the processing unit 4 determines that the third or fourth magnetic sensing component 33, 34 is at a position corresponding to one of the incremental-track boundaries 220 when the magnetic field sensed by the third or fourth magnetic sensing component 33, 34 falls within the predetermined magnetic field range, and determines that the third or fourth magnetic sensing component 33, 34 is at a position corresponding to the first or second incremental-track magnetized regions 221, 222 when otherwise.

The first magnetic sensing components 31 and the second magnetic sensing components 32 are configured to sense magnetic fields of ones of the absolute-track magnetized regions 211 that correspond in position thereto (at the time) for the processing unit 4 to perform decoding thereon so as to obtain absolute position information of an object (e.g., metrology systems, motion systems, CNC Mills, semiconductor steppers, etc.) mounted with the encoder device 2. In this embodiment, the fifth magnetic sensing component 35 is a magnetoresistive sensor that corresponds to the incremental magnetic track 22, and that is configured to sense movement amount of the first incremental-track magnetized regions 221 and the second incremental-track magnetized regions 222 by magnetic sensing for the processing unit 4 to obtain displacement information of the encoder device 2.

The processing unit 4 is configured to select, based on a relative positional relationship (e.g., distance) between the third and fourth magnetic sensing components 33, 34, and a relative positional relationship between the third magnetic sensing component 33 and the first and second magnetic sensing components 31, 32 (e.g., displacement between the third magnetic sensing component 33 and the first magnetic sensing components 31, distance between adjacent first and second magnetic sensing components 31, 32, and/or posit ions of the first and second magnetic sensing components 31, 32 with respect to the absolute-track magnetized regions 211), magnetic fields sensed by one of the group of first magnetic sensing components 31 and the group of second magnetic sensing components 32, to perform decoding thereon so as to obtain absolute position information when one of a first condition, a second condition, a third condition and a fourth condition is satisfied, and to select magnetic fields sensed by the other one of the group of first magnetic sensing components 31 and the group of second magnetic sensing components 32 to perform decoding thereon so as to obtain absolute position information when one of a fifth condition, a sixth condition, a seventh condition and an eighth condition is satisfied.

The first condition is that the third magnetic sensing component 33 senses a magnetic field of one of the first incremental-track magnetized regions 221 (i.e., the sensed magnetic field is out of the predetermined magnetic field range, and has magnetic polarity corresponding to the first incremental-track magnetized regions 221), and that the fourth magnetic sensing component 34 senses a magnetic field of one of the second incremental-track magnetized regions 222 (i.e., the sensed magnetic field is out of the predetermined magnetic field range, and has magnetic polarity corresponding to the second incremental-track magnetized regions 222).

The second condition is that the third and fourth magnetic sensing components 33, 34 respectively sense a magnetic field that falls within the predetermined magnetic field range, and a magnetic field of one of the second incremental-track magnetized regions 222.

The third condition is that the third and fourth magnetic sensing components 33, 34 each sense a magnetic field of one of the second incremental-track magnetized regions 222.

The fourth condition is that the third and fourth magnetic sensing components 33, 34 respectively sense a magnetic field of one of the second incremental-track magnetized regions 222, and a magnetic field that falls within the predetermined range.

The fifth condition is that the third and fourth magnetic sensing components 33, 34 respectively sense a magnetic field of one of the second incremental-track magnetized regions 222, and a magnetic field of one of the first incremental-track magnetized regions 221.

The sixth condition is that the third and fourth magnetic sensing components 33, 34 respectively sense a magnetic field that falls within the predetermined range, and a magnetic field of one of the first incremental-track magnetized regions 221.

The seventh condition is that the third and fourth magnetic sensing components 33, 34 each sense a magnetic field of one of the first incremental-track magnetized regions 221.

The eighth condition is that the third and fourth magnetic sensing components 33, 34 respectively sense a magnetic field of one of the first incremental-track magnetized regions 221, and a magnetic field that falls within the predetermined range.

FIGS. 3-10 illustrate operations of a first implementation of the first embodiment, where N is a positive even integer, and the third magnetic sensing component 33 is aligned with the leftmost one of the first magnetic sensing components 31. In these figures, N is exemplified to be two, i.e., the third and fourth magnetic sensing components 33, 34 are spaced apart from each other by a distance of 1.5 P. When the magnetic fields sensed by the third and fourth magnetic sensing components 33, 34 satisfy the first condition (FIG. 3), the second condition (FIG. 4), the third condition (FIG. 5) or the fourth condition (FIG. 6), the processing unit 4 selects magnetic fields sensed by the group of second magnetic sensing components 32 to perform decoding thereon so as to obtain absolute position information (noting that the first magnetic sensing components 31 are at positions corresponding to the absolute-track boundaries 210 in FIG. 4); and when the magnetic fields sensed by the third and fourth magnetic sensing components 33, 34 satisfy the fifth condition (FIG. 7), the sixth condition (FIG. 8), the seventh condition (FIG. 9) or the eighth condition (FIG. 10), the processing unit 4 selects magnetic fields sensed by the group of first magnetic sensing components 31 to perform decoding thereon so as to obtain absolute position information (noting that the second magnetic sensing components 32 are at positions corresponding to the absolute-track boundaries 210 in FIG. 8).

FIGS. 11-18 illustrate operations of a second implementation of the first embodiment, where N is a positive odd integer, and the third magnetic sensing component 33 is aligned with the leftmost one of the first magnetic sensing components 31. In these figures, N is exemplified to be three, i.e., the third and fourth magnetic sensing components 33, 34 are spaced apart from each other by a distance of 2.5 P. When the magnetic fields sensed by the third and fourth magnetic sensing components 33, 34 satisfy the first condition (FIG. 11), the second condition (FIG. 12), the third condition (FIG. 13) or the fourth condition (FIG. 14), the processing unit 4 selects magnetic fields sensed by the group of first magnetic sensing components 31 to perform decoding thereon so as to obtain absolute position information (noting that the second magnetic sensing components 32 are at positions corresponding to the absolute-track boundaries 210 in FIG. 12); and when the magnetic fields sensed by the third and fourth magnetic sensing components 33, 34 satisfy the fifth condition (FIG. 15), the sixth condition (FIG. 16), the seventh condition (FIG. 17) or the eighth condition (FIG. 18), the processing unit 4 selects magnetic fields sensed by the group of second magnetic sensing components 32 to perform decoding thereon so as to obtain absolute position information (noting that the first magnetic sensing components 31 are at positions corresponding to the absolute-track boundaries 210 in FIG. 16).

By the selection rules as described for the first and second exemplary implementations (i.e., selecting the magnetic fields sensed by the first or second magnetic sensing components 31, 32 which are not at positions corresponding to the absolute-track boundaries 210 to perform decoding thereon), misreading of the absolute position information from the first or second magnetic sensing components 31, 32 being at positions corresponding to the absolute-track boundaries 210 may be prevented. In addition, the third and fourth magnetic sensing components 33, 34 that are analog Hall sensors may detect distribution of magnetic flux density of the incremental magnetic track 22, thus favoring magnetic flux sensing at the incremental-track boundaries 220 of which variation of magnetic flux is relatively small, and achieving correct readout of the absolute position information.

Figure 19:
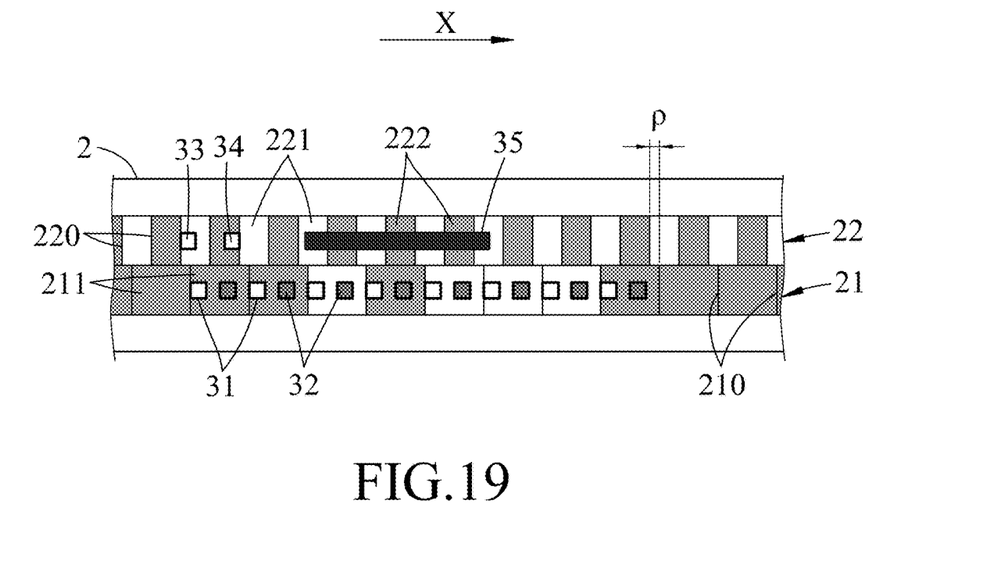
FIG. 19 is a schematic diagram illustrating a third exemplary implementation of the first embodiment.

FIG. 19 illustrates a third exemplary implementation of the first embodiment. The third exemplary implementation is similar to the first exemplary implementation, and differs in that, compared to the first exemplary implementation, the absolute magnetic track 21 of the third exemplary implementation shifts by a distance of ρ with respect to the incremental magnetic track 22 in the moving direction (X), where $0 \leq \rho \leq 2$ P. In other words, for each of the absolute-track boundaries 210, the closest one of the incremental-track boundaries 220 is spaced apart therefrom by the distance of ρ (i.e., ρ=0 in the first exemplary implementation) in a displacement direction, which may be same as or opposite to the moving direction (X) in FIG. 19. In order to maintain the relative positional relationship between the third magnetic sensing component 33 and the first and second magnetic sensing components 31, 32, a center of the third magnetic sensing component 33 is spaced apart from a center of the closest one of the first and second magnetic sensing components 31, 32 by a distance of ρ in the displacement direction, so the same selection rules as described for the first exemplary implementation may apply, preventing misreading of the absolute position information.

Figure 20:
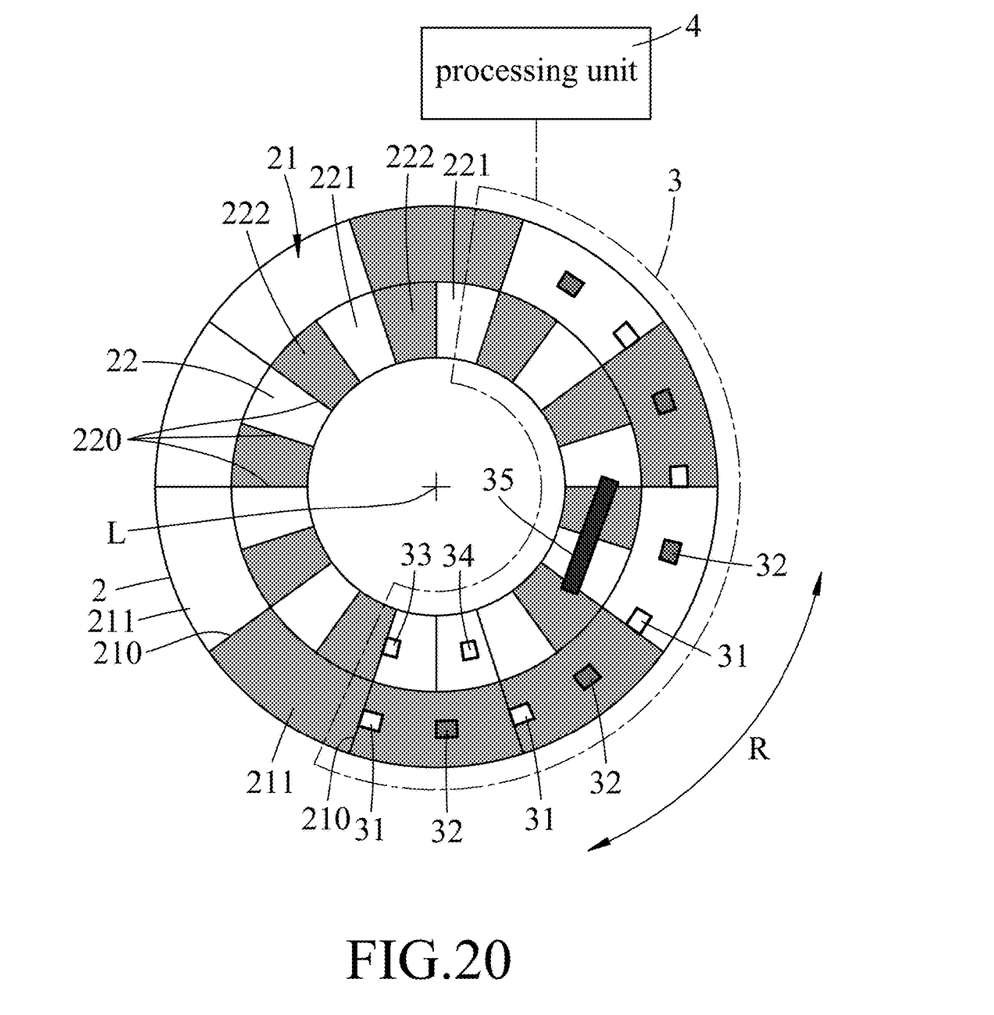
FIG. 20 is a schematic diagram illustrating a second embodiment of the absolute position readout device according to this disclosure.

Referring to FIG. 20, the second embodiment of the absolute position readout device according to this disclosure is shown to be similar to the first embodiment, and differs in that: in the second embodiment, the encoder device 2 and the readout device 3 are configured such that the encoder device 2 is rotatable relative to the readout device 3 along a rotary direction (R) about an axis (L); the absolute magnetic track 21 and the incremental magnetic track 22 are disposed concentrically, side-by-side in radial directions with respect to the axis (L), and each of the absolute magnetic track 21 and the incremental magnetic track 22 extends in the rotary direction (R); the absolute-track boundaries 210 are formed equidistantly along the rotary direction (R) with an angular distance between each adjacent two being 2 A; the incremental-track boundaries 220 are formed equidistantly along the rotary direction (R) with an angular distance between each adjacent two being A; each absolute-track boundary 210 is aligned with one of the incremental-track boundaries 220 in the radial direction; the first magnetic sensing components 31 are arranged equidistantly along the rotary direction (R) with an angular distance between each adjacent two thereof being 2 A; the first magnetic sensing components 31 and the second magnetic sensing components 32 are arranged alternately along the rotary direction (R) and adjacent ones thereof are spaced apart from each other by an angular distance of A; the third magnetic sensing component 33 is aligned with one of the first magnetic sensing components 31 and the second magnetic sensing components 32 in one of the radial directions; and the third and fourth magnetic sensing components 33, 34 are spaced apart from each other along the rotary direction (R) by an angular center-to-center distance of (N−0.5)×A, where N is a positive integer.

The selection rules described for the first embodiment are also applicable to the second embodiment, thereby achieving the same advantages and effects. Similar to the third exemplary implementation of the first embodiment, in one implementation of the second embodiment, the absolute magnetic track 21 may shift by an angular distance of α with respect to the incremental magnetic track 22 in the rotary direction (R), where $0 \leq \alpha \leq 2$ A. In other words, for each of the absolute-track boundaries 210, a closest one of the incremental-track boundaries 220 is spaced apart therefrom by an angular distance of α in a displacement direction same as or opposite to the rotary direction (R). In order to maintain the relative positional relationship between the third magnetic sensing component 33 and the first and second magnetic sensing components 31, 32, the third magnetic sensing component 33 is spaced apart from the closest one of the first and second magnetic sensing components 31, 32 by an angular distance of α in the displacement direction, so the same selection rules as described for the first exemplary implementation may apply, preventing misreading of the absolute position information.

Figure 21:
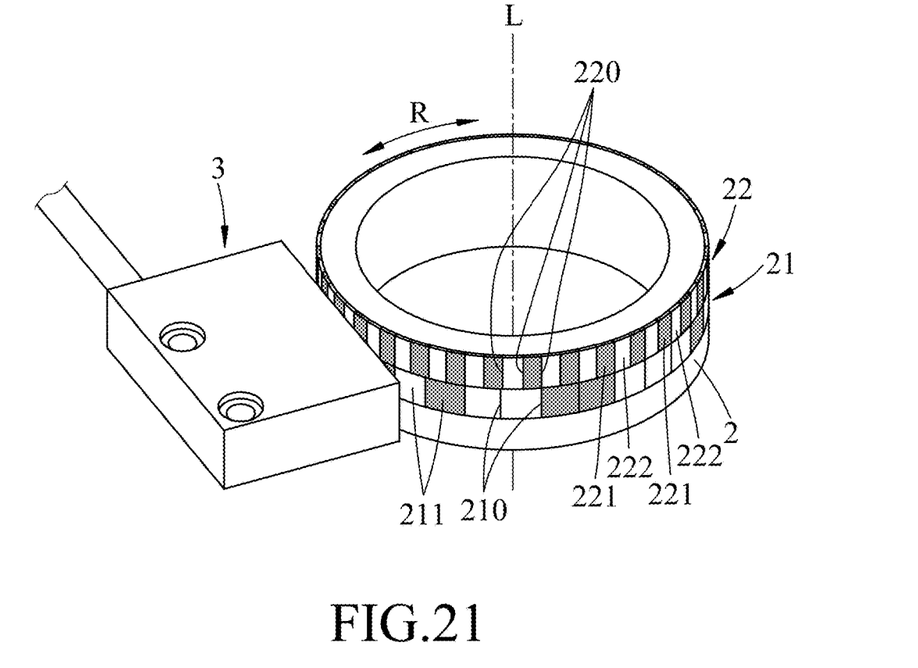
FIG. 21 is a fragmentary perspective view illustrating a third embodiment of the absolute position readout device according to this disclosure.

Referring to FIG. 21, the third embodiment of the absolute position readout device according to this disclosure is shown to be similar to the second embodiment, and differs in that, in the third embodiment, the absolute magnetic track 21 and the incremental magnetic track 22 are disposed side-by-side in a direction parallel to the axis (L), and the readout device 3 is disposed to face a periphery of the encoder device 2, and is adjacent to the absolute magnetic track and the incremental magnetic track 22. Such configuration may achieve the same advantages and effects as those of the second embodiment.

It is noted that, in the first embodiment of this disclosure, a width of each of the absolute-track magnetized regions 211 is twice that of each of the first and second incremental-track magnetized regions 221, 222, leading to longer (twice in length) magnetic tracks in comparison to a configuration where the absolute-track magnetized regions 211 and the first and second incremental-track magnetized regions 221, 222 have the same width or angular width, and thus being suitable to bigger equipments without increase of sensors.

In the description above, for the purposes of explanation, numerous specific details have been set forth in order to provide a thorough understanding of the embodiment(s). It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An absolute position readout apparatus comprising an encoder device and a readout device that are spaced apart from each other, and said encoder device being movable relative to said readout device in a moving direction;

wherein said encoder device includes an absolute magnetic track and an incremental magnetic track, each of which extends in the moving direction;

wherein said absolute magnetic track has a plurality of absolute-track magnetized regions which form a plurality of absolute-track boundaries thereamong, said absolute-track boundaries being formed equidistantly along the moving direction with a distance between each adjacent two thereof being 2P which defines a width of each of said absolute-track magnetized regions;

wherein said incremental magnetic track has a plurality of first incremental-track magnetized regions with first magnetic polarity and a plurality of second incremental-track magnetized regions with second magnetic polarity which differs from the first magnetic polarity, said first incremental-track magnetized regions and said second incremental-track magnetized regions being arranged alternately and forming a plurality of incremental-track boundaries thereamong, said incremental-track boundaries being formed equidistantly along the moving direction with a distance between each adjacent two thereof being P which defines a width of each of said first and second incremental-track magnetized regions, said absolute-track magnetized regions thereby being wider than said first and second incremental-track magnetized regions;

wherein, for each of said absolute-track boundaries, a closest one of said incremental-track boundaries is spaced apart therefrom by a distance of p in a displacement direction same as or opposite to the moving direction, where $0 \leq \rho \leq 2P$; and when $\rho=0$, said absolute-track boundary is aligned with said closest one of said incremental-track boundaries;

wherein said readout device includes:
   a group of first magnetic sensing components that correspond to said absolute magnetic track, and that are arranged equidistantly along the moving direction with a distance between each adjacent two thereof being 2P;
   a group of second magnetic sensing components that correspond to said absolute magnetic track, wherein said first magnetic sensing components and said second magnetic sensing components are arranged alternately along the moving direction and adjacent ones thereof are spaced apart from each other by a distance of P;
   a third magnetic sensing component that corresponds to said incremental magnetic track, and that is spaced apart from a closest one of said first and second magnetic sensing components by a distance of p in the displacement direction; and
   a fourth magnetic sensing component that corresponds to said incremental magnetic track, and that is spaced apart from said third magnetic sensing component along the moving direction by a center-to-center distance of $(N-0.5) \times P$, where N is a positive integer; and wherein, when $\rho=0$, said third magnetic sensing component is aligned with one of said first magnetic sensing components and said second magnetic sensing components.

2. The absolute position readout apparatus of claim 1, further comprising a processing unit electrically coupled to said group of first magnetic sensing components, said group of second magnetic sensing components, said third magnetic sensing component and said fourth magnetic sensing component;

said processing unit being configured:
   to select, based on a relative positional relationship between said third and fourth magnetic sensing components, and a relative positional relationship between said third magnetic sensing component and said first and second magnetic sensing components, magnetic fields sensed by one of said group of first magnetic sensing components and said group of second magnetic sensing components to perform decoding thereon to obtain absolute position information when one of a first condition, a second condition, a third condition and a fourth condition is satisfied, and
   to select magnetic fields sensed by the other one of said group of first magnetic sensing components and said group of second magnetic sensing components to perform decoding thereon to obtain absolute position information when one of a fifth condition, a sixth condition, a seventh condition and an eighth condition is satisfied;

wherein:
   the first condition is that said third and fourth magnetic sensing components respectively sense a magnetic field of one of said first incremental-track magnetized regions, and a magnetic field of one of said second incremental-track magnetized regions;
   the second condition is that said third and fourth magnetic sensing components respectively sense a magnetic field that falls within a predetermined range corresponding to one of said incremental-track boundaries, and a magnetic field of one of said second incremental-track magnetized regions;

the third condition is that said third and fourth magnetic sensing components each sense a magnetic field of one of said second incremental-track magnetized regions;

the fourth condition is that said third and fourth magnetic sensing components respectively sense a magnetic field of one of said second incremental-track magnetized regions, and a magnetic field that falls within the predetermined range;

the fifth condition is that said third and fourth magnetic sensing components respectively sense a magnetic field of one of said second incremental-track magnetized regions, and a magnetic field of one of said first incremental-track magnetized regions;

the sixth condition is that said third and fourth magnetic sensing components respectively sense a magnetic field that falls within the predetermined range, and a magnetic field of one of said first incremental-track magnetized regions;

the seventh condition is that said third and fourth magnetic sensing components each sense a magnetic field of one of said first incremental-track magnetized regions; and the eighth condition is that said third and fourth magnetic sensing components respectively sense a magnetic field of one of said first incremental-track magnetized regions, and a magnetic field that falls within the predetermined range.

3. The absolute position readout apparatus of claim 2, wherein said first magnetic sensing components and said second magnetic sensing components are digital Hall sensors, and said third magnetic sensing component and said fourth magnetic sensing component are analog Hall sensors.

4. The absolute position readout apparatus of claim 1, wherein the width of each of said absolute-track magnetized regions is twice that of each of said first and second incremental-track magnetized regions.

5. The absolute position readout apparatus of claim 1, wherein said readout device further includes a fifth magnetic sensing component that is a magnetoresistive sensor that corresponds to said incremental magnetic track, and that is configured to sense movement amount of said first incremental-track magnetized regions and said second incremental-track magnetized regions by magnetic sensing.

6. An absolute position readout apparatus comprising an encoder device and a readout device that are spaced apart from each other, said encoder device being rotatable relative to said readout device in a rotary direction about an axis;

wherein said encoder device includes an absolute magnetic track and an incremental magnetic track which are disposed concentrically and side-by-side and each of which extends in the rotary direction;

wherein said absolute magnetic track has a plurality of absolute-track magnetized regions which form a plurality of absolute-track boundaries thereamong, said absolute-track boundaries being formed equidistantly along the rotary direction with an angular distance between each adjacent two thereof being 2A which defines an angular width of each of said absolute-track magnetized regions;

wherein said incremental magnetic track has a plurality of first incremental-track magnetized regions with first magnetic polarity and a plurality of second incremental-track magnetized regions with second magnetic polarity which differs from the first magnetic polarity, said first incremental-track magnetized regions and said second incremental-track magnetized regions being arranged alternately and forming a plurality of incremental-track boundaries thereamong, said incremental-track boundaries being formed equidistantly along the rotary direction with an angular distance between each adjacent two thereof being A which defines an angular width of each of said first and second incremental-track magnetized regions, said absolute-track magnetized regions thereby being wider than said first and second incremental-track magnetized regions;

wherein, for each of said absolute-track boundaries, a closest one of said incremental-track boundaries is spaced apart therefrom by an angular distance of a in a displacement direction same as or opposite to the rotary direction, where a $0 \leq \alpha \leq 2A$; when $\alpha=0$, said absolute-track boundary is aligned with said closest one of said incremental-track boundaries in a radial direction with respect to the axis;

wherein said readout device includes:
  a group of first magnetic sensing components that correspond to said absolute magnetic track, and that are arranged equidistantly along the rotary direction with an angular distance between each adjacent two thereof being 2A;
  a group of second magnetic sensing components that correspond to said absolute magnetic track, wherein said first magnetic sensing components and said second magnetic sensing components are arranged alternately along the rotary direction and adjacent ones thereof are spaced apart from each other by an angular distance of A;
  a third magnetic sensing component that corresponds to said incremental magnetic track, and that is spaced apart from a closest one of said first and second magnetic sensing components by an angular distance of a in the displacement direction; and
  a fourth magnetic sensing component that corresponds to said incremental magnetic track, and that is spaced apart from said third magnetic sensing component along the rotary direction by an angular center-to-center distance of $(N-0.5) \times A$, where N is a positive integer; and wherein, when $\alpha=0$, said third magnetic sensing component is aligned with one of said first magnetic sensing components and said second magnetic sensing components in the radial direction.

7. The absolute position readout apparatus of claim 6, further comprising a processing unit electrically coupled to said group of first magnetic sensing components, said group of second magnetic sensing components, said third magnetic sensing component and said fourth magnetic sensing component;

said processing unit being configured:
  to select, based on a relative positional relationship between said third and fourth magnetic sensing components, and a relative positional relationship between said third magnetic sensing component and said first and second magnetic sensing components, magnetic fields sensed by one of said group of first magnetic sensing components and said group of second magnetic sensing components to perform decoding thereon to obtain absolute position information when one of a first condition, a second condition, a third condition and a fourth condition is satisfied, and to select magnetic fields sensed by the other one of said group of first magnetic sensing components and said group of second magnetic sensing components to perform decoding thereon to obtain absolute position information when one of a fifth condition, a sixth condition, a seventh condition and an eighth condition is satisfied;

wherein:
the first condition is that said third and fourth magnetic sensing components respectively sense a magnetic field of one of said first incremental-track magnetized regions, and a magnetic field of one of said second incremental-track magnetized regions;

the second condition is that said third and fourth magnetic sensing components respectively sense a magnetic field that falls within a predetermined range corresponding to one of said incremental-track boundaries, and a magnetic field of one of said second incremental-track magnetized regions;

the third condition is that said third and fourth magnetic sensing components each sense a magnetic field of one of said second incremental-track magnetized regions;

the fourth condition is that said third and fourth magnetic sensing components respectively sense a magnetic field of one of said second incremental-track magnetized regions, and a magnetic field that falls within the predetermined range;

the fifth condition is that said third and fourth magnetic sensing components respectively sense a magnetic field of one of said second incremental-track magnetized regions, and a magnetic field of one of said first incremental-track magnetized regions;

the sixth condition is that said third and fourth magnetic sensing components respectively sense a magnetic field that falls within the predetermined range, and a magnetic field of one of said first incremental-track magnetized regions;

the seventh condition is that said third and fourth magnetic sensing components each sense a magnetic field of one of said first incremental-track magnetized regions; and the eighth condition is that said third and fourth magnetic sensing components respectively sense a magnetic field of one of said first incremental-track magnetized regions, and a magnetic field that falls within the predetermined range.

8. The absolute position readout apparatus of claim 7, wherein said first magnetic sensing components and said second magnetic sensing components are digital Hall sensors, and said third magnetic sensing component and said fourth magnetic sensing component are analog Hall sensors.

9. The absolute position readout apparatus of claim 6, wherein the angular width of each of said absolute-track magnetized regions is twice that of each of said first and second incremental-track magnetized regions.

10. The absolute position readout apparatus of claim 6, wherein said readout device further includes a fifth magnetic sensing component that is a magnetoresistive sensor that corresponds to said incremental track, and that is configured to sense rotation amount of said first incremental-track magnetized regions and said second incremental-track magnetized regions by magnetic sensing.

* * * * *